Jan. 12, 1937.    A. C. ELDER    2,067,179
SAW SHARPENER
Filed March 4, 1935    2 Sheets-Sheet 1

INVENTOR.
AUSTIN C. ELDER
BY
Kwis Hudson & Kent
ATTORNEYS

Jan. 12, 1937. A. C. ELDER 2,067,179
SAW SHARPENER
Filed March 4, 1935 2 Sheets-Sheet 2
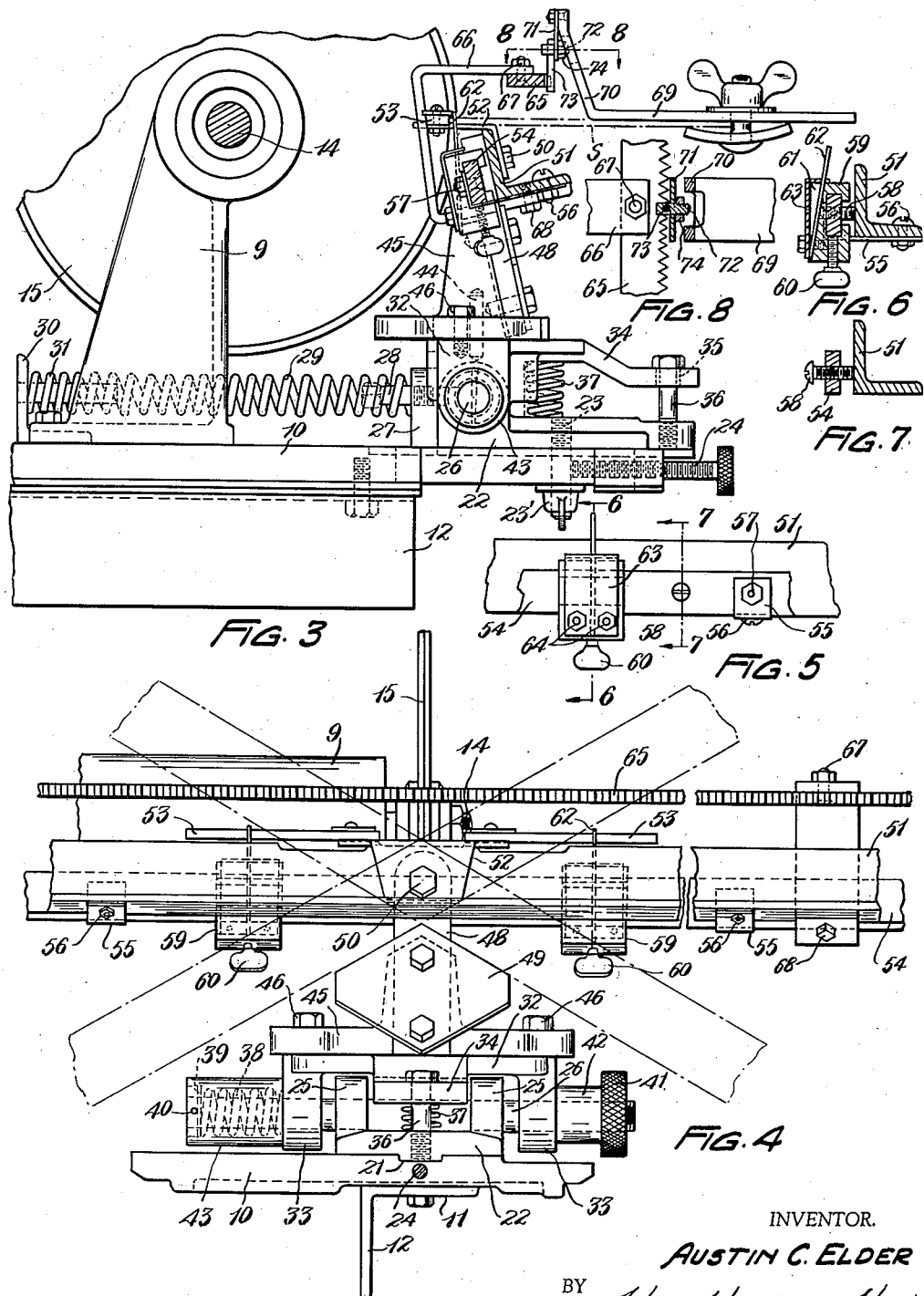
INVENTOR.
AUSTIN C. ELDER
BY
Kwis Hudson & Kent
ATTORNEYS Patented Jan. 12, 1937

2,067,179

UNITED STATES PATENT OFFICE 2,067,179

SAW SHARPENER

Austin C. Elder, Canton, Ohio

Application March 4, 1935, Serial No. 9,233

10 Claims. (Cl. 76—37)

This invention relates to improvements in saw sharpeners, having reference particularly to machines for sharpening reciprocating saws such as hand saws, but applicable in some of its aspects to other types of saws.

One of the objects of the invention is the provision of a machine of simple and inexpensive character which shall nevertheless be capable of performing its functions accurately and rapidly.

Another object of the invention is the provision in a machine of this character of means for effecting the bevel adjustment for cross-cut saws in such manner that the saw itself may remain in a horizontal position for the convenience of the operator.

Another object is the provision of a bench type machine so constructed that the bevel adjustment for cross-cut saws may be secured by merely tilting the machine itself on the bench and bringing the saw support to horizontal position.

Another object of the invention is the provision of resilience in the saw indexing means, such that the saw may be indexed while withdrawn from engagement with the grinding wheel and then fed into engagement with the wheel by a manual operation.

A further object of the invention is the provision of a supporting and guiding element for the saw which is adjustable about an axis approximately in the plane of the grinding wheel but not in a radius of the wheel, whereby the support may be moved to one side or the other to obtain the right and left hand bevels necessary upon alternate teeth of a cross-cut saw, leaving unaffected the adjustment for the hook on the teeth.

Still another object is the provision of an indexing rack for any given saw having the same number of teeth per inch as there are like teeth in the saw, that is to say the rack may be used for a rip-saw having the same number of teeth as the rack, or for a cross-cut saw having twice the number of teeth as the rack, it being noted that in a cross-cut saw half of the teeth are of one form and half of the other form.

Other objects and features of novelty will appear as I proceed with the description of that embodiment of the invention which, for the purposes of the present application, I have illustrated in the accompanying drawings, in which Fig. 1 is a perspective view of my machine arranged for grinding alternate teeth of a cross-cut saw, the indexing rack being removed.

Fig. 3 is an end view of the machine as shown in Fig. 2.

Fig. 4 is a front elevation without the saw.

Fig. 5 is a fragmental rear elevation of one of the combined indexing and saw guiding pins which cooperate directly with the saw.

Fig. 6 is a transverse sectional view of the same taken substantially on the line 6—6 of Fig. 5.

Fig. 7 is a transverse sectional view taken substantially on the line 7—7 of Fig. 5, showing means for adjusting the bar upon which the indexing pins are carried, and Fig. 8 is a horizontal sectional view taken substantially on the line 8—8 of Fig. 3, showing the indexing pin which cooperates with the indexing rack.

Figure 1:
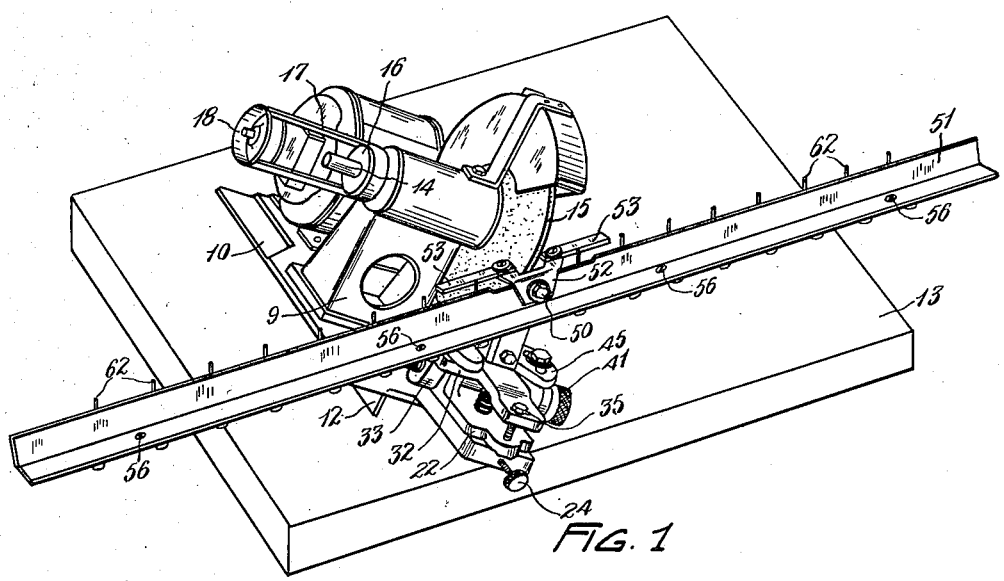

In the drawings the base of my machine is shown at 10. It consists preferably of a casting of fairly heavy construction. On its under side there is secured an angle iron 11, one flange of which forms a downwardly extending rib 12 that is located halfway between the side edges of the base. This flange 12 is preferably of such width that when the base is tilted upon the rib in either direction to rest partly upon the rib and partly upon one side edge of the base, as shown in Fig. 1, the base then stands at an angle of substantially 30° with the horizontal or with the bench upon which it rests, the bench being indicated at 13 in Fig. 1.

Figure 2:
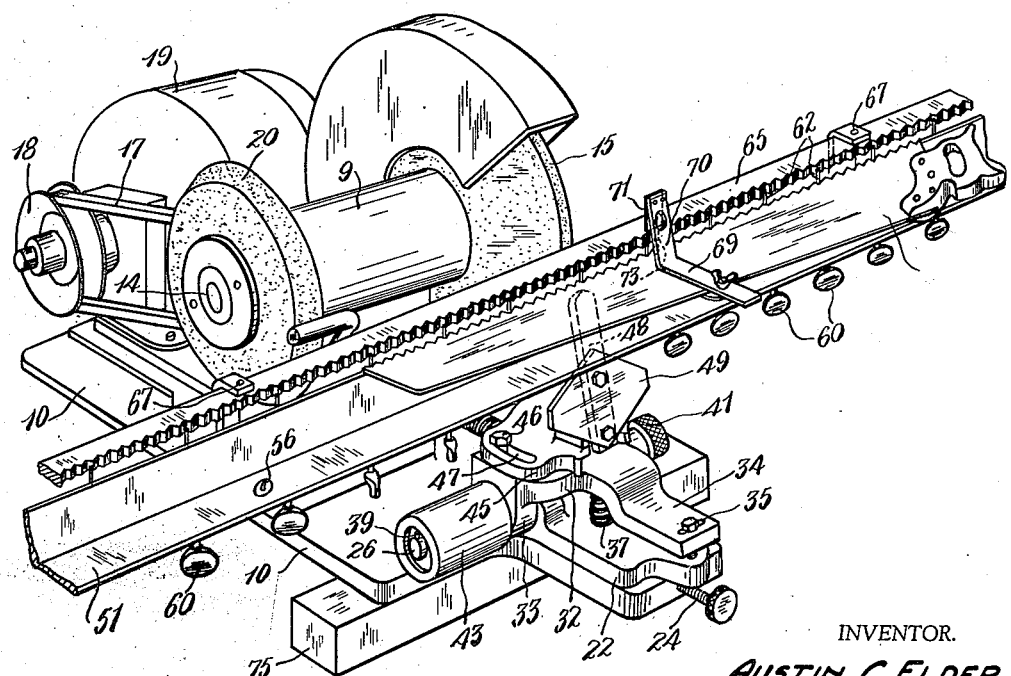
Fig. 2 is a perspective of the machine set-up for grinding all of the teeth of a rip-saw.

Upon the base 10 I mount a support 9 for a grinding wheel arbor 14, carrying at one end the grinding wheel 15, which is a thin wheel preferably with a double bevel suitable for grinding one edge of one tooth and the adjacent edge of the next tooth simultaneously. On the arbor 14 there is a pulley 16, over which runs a belt 17 that is driven from a pulley 18 on the shaft of an electric motor 19 which is secured to the base 10 rearwardly of the grinding wheel and its mounting. As shown in Fig. 2, the arbor 14 may also carry a grinding wheel 20 of ordinary form which may be used for removing entirely the teeth of a saw which is in bad condition preparatory to providing a completely new set of teeth.

In the upper surface of the base 10 I machine a guide groove or way 21, with which a slide 22 cooperates. This slide is provided with a stud 23 which is threaded into the slide and extends downwardly therefrom through a slot in the base 10. A screw 24 mounted in a threaded opening in the forward extremity of the base 10 bears against the stud 23, and when turned clockwise forces the stud and the slide 22 rearwardly. At the rear end of the slide 22 there are a pair of perforated ears 25 through which extends a transverse rod 26. There is also a rear wall 27 on the slide in which is threaded a stud 28 that bears at its forward extremity against the rod 26 and locks it in place. A compression coil spring 29 surrounds the stud 28 and bears against the rear wall 27 of the slide at one end, while its opposite end bears against an angle bar 30 or the like on the base, a pin 31 being threaded into the angle bar 30 and extending forward for a distance into the space enclosed by the coils of the spring for holding the latter against displacement. It will be apparent that when the screw 24 is threaded inwardly the slide 22 moves rearwardly compressing the spring 29, and that when the screw 24 is threaded outwardly the coil spring 29 exerts pressure to move the slide 22 forwardly and to keep the stud 23 against the end of screw 24. When an adjustment has been made a thumb nut 23' may be threaded upwardly upon the lower extremity of the stud 23 to lock the parts in adjusted position. Obviously the slide could be moved in both directions by screw mechanism if desired.

Pivotally supported upon the rod 26 is a table 32. This table is provided with depending perforated ears 33, through which the rod 26 extends, the two ears 33 straddling the two ears 25, as will be seen by reference to Fig. 4. An arm 34 extends forwardly from the table 32. Near its forward extremity it is provided with a slot 35 for the reception of a headed stud 36, which is threaded into a hole in the slide 22. A compression coil spring 37 tends to swing the arm 34 upwardly around the rod 26. Hence, by turning the stud 36 in one direction or the other, the table 32 is tilted backwardly or forwardly.

A coil spring 39 surrounds one end of the rod 26, bearing against one of the ears 33 and against a washer 39 held in place by a cotter pin 40 which extends through a hole in the rod. On the opposite end of the rod 26 there is threaded a knurled nut 41 with an integral hub 42 which bears against the other ear 33. The spring 38 may be protected, if desired, by a cylindrical covering 43 of rubber or other suitable material. When the nut 41 is turned inwardly as viewed in Fig. 4, the table 32 moves toward the left, compressing spring 38, and when the nut is turned outwardly the spring 38 acts to shift the table 32 to the right, holding it up against the hub 42 of the nut.

In the table 32, centrally above the rod 26, I mount an upright pin 44. A bracket 45 with a flat bottom rests upon the table 32, and has a central bore in its lower side to receive pin 44, by which it is centered. For purposes of adjustment this bracket may be turned about the pin 44 through a limited angle, being normally clamped in position by studs 46 which extends through arcuate slots 47 in the bracket.

On its forward side the bracket 45 carries a flat plate or bar 48 which is inclined rearwardly toward the top at an angle of 12° approximately with respect to the pin 44. On the forward side of the bar 48 there is secured a stop plate 49, the upper edges of which are inclined downwardly in opposite directions at the same angle, the angle being preferably 30°, or the same angle as that which the base assumes when tilted upon its rib 12.

In the upper end of the bar 48 there is a stud 50 extending at right angles to the inclined surface of the bar 48. Upon this stud I mount the saw support 51, which in the present embodiment consists of an angle iron that extends transversely a considerable distance on either side of the wheel 15. The saw to be sharpened is caused to rest upon the upper flange of this support, as illustrated at S in Fig. 2. Midway of the support the upper flange is cut away for a distance in order to accommodate a small bracket 52 which extends rearwardly a short distance, where it supports two bars 53 that extend parallel to the support 51 and acts as stops to limit the movement of the saw rearwardly toward the grinding wheel.

Behind the support 51 I mount a bar 54 which extends practically the full length of the support. This bar is preferably carried upon a resilient mounting, which may consist of angular spring metal pieces 55, that are attached by bolts or screws 56 to the lower flange of support 51, and by bolts or screws 57 to the rear side of bar 54. Screws 58 are threaded through the bar 54 and bear against the rear wall of support 51. By adjusting these screws 58 the bar 54 may be tilted downwardly and backwardly away from the support 51, the metal pieces 55 being flexed and put under tension in the process.

At regular intervals of two inches, or a multiple thereof, along the length of the bar 54 I mount clamps 59, which are C-shaped in cross section and embrace the bar. They are locked in position by thumb screws 60 or equivalent means. In the rear of each clamp 59 there is an inclined slot 61 in which is placed a spring metal pin 62 that projects upwardly above the top of support 51. 63 is an angular spring metal plate which is fastened to the clamp 59 at the bottom thereof by studs 64 or the like. The lower end of the pin 62 is secured by this means, but the upper end thereof is free to move in the slot 61. These pins 62 are adapted to extend into the spaces between adjacent teeth of a saw to be sharpened. They are spaced two inches apart because by so doing they will fit the teeth of any hand saw. Some saws for instance have five and one-half or six and one-half teeth to the inch, in which case they would not fit pins spaced one inch apart, but by spacing the pins two inches or four inches all saws may be accommodated. When a saw is to be indexed it is caused to engage the pins 62, which are then in a forward position as indicated in Fig. 6. The saw is then held against longitudinal movement, but it may be pushed in toward the grinding wheel because of the flexibility of the pins 62 and the clamping plate 63, which yield in a rearward direction, the pins being guided however by the slots 61.

Indexing may be accomplished with the pins 62 alone. In such case the operator moves a rip-saw along one tooth at a time, grinding every tooth in succession with the same machine set-up. When grinding a cross-cut saw, however the operator indexes the saw two teeth at a time, grinding one set of like teeth for one set-up of the machine, and changing the bevel angle for the other or intermediate set of teeth.

As an aid for the grinding of cross-cut saws particularly, I employ a rack 65 which extends throughout a major portion of the length of the saw support 51 and is carried from that support by means of bracket arms 66. These arms extend rearwardly from the rack, to which they are attached by bolts 67, downwardly behind the support 51 and bar 54, and forwardly beneath the lower flange of saw support 51, to which they are secured by bolts 68 or the like. When grinding a given cross-cut saw, a rack is selected which has half as many teeth per inch as the saw to be ground. For a rip-saw a rack is selected having the same number of teeth as the saw. In many cases the same rack will serve for a rip-saw and a cross-cut saw having twice the number of teeth of the rip-saw. When using this rack I attach a clamp 69 to the saw near the middle thereof. This clamp has an upwardly and rearwardly extending arm 70, to the upper end of which is secured a spring metal plate 71. A stud 72 is carried at the lower end of plate 71. On the rear side of the plate this stud is bored to receive an indexing pin 73, which is clamped to the plate 71 by means of a nut 74 threaded onto the forward end of the stud 72. The plates 71 provide the necessary resilience to enable the saw to be pushed in against the grinding wheel after the saw is indexed by the engagement of the pin in one of the rack spaces.

When the rack 65 is used, the pins 62 may be thrown back out of operative position, if desired, by threading inwardly the screws 58. I prefer however to use these pins 62 in conjunction with the rack and pin 73, because the pins 62 assist the operator materially in holding the saw against any unintentioned movement in the horizontal plane.

*Operation.*—Assuming first that it is desired to grind the teeth of a rip-saw, where the teeth have no bevel and it is consequently necessary to arrange the grinding wheel at right angles to the saw, the base 10 is then supported in a horizontal position by blocking up the forward end thereof in front of the rib 12 with a transversely extending bar 75, see Fig. 2. The support 51 is also adjusted to a horizontal position. Then, in order to provide the desired hook to the teeth, the operator loosens studs 46 and turns bracket 45 about its centering pin 44 until the proper hook angle is obtained. This can be determined by moving one of the saw teeth into engagement with the grinding wheel 15 while the latter is at rest. Then the studs 46 are tightened down. A rack 65 having the proper number of teeth is selected and mounted in the machine. The clamp 69 is then attached to the saw near the middle thereof and the indexing pin 73 is caused to engage in a space of the rack 65. When this is done the corresponding tooth of the saw may not come into exact registry with the grinding wheel 15, but proper registry can be obtained by turning thumb nut 41 to shift the support 51 lengthwise and by turning screw 24 to shift it inwardly or outwardly. The machine is then ready for the operation of grinding this particular saw, and the operator proceeds to do so, indexing the saw one tooth at a time between successive grinding operations.

When it is desired to grind a cross-cut saw, the teeth of which are beveled at 30° angles, the bracket 45 is first returned to intermediate position, so that support 51 takes a position at right angles to the plane of the grinding wheel. A rack 65 having half as many teeth as the saw to be sharpened is selected and mounted in the machine. The base 10 is then caused to assume a tilted position, as in Fig. 1, the stud 50 is loosened, and the saw support 51 is swung into a horizontal position, as shown in Fig. 1, being stopped in that position by the stop plate 49. The clamp 69 is then attached to the saw, and the pin 73 caused to engage between adjacent teeth of the rack. Adjustments are now made by means of nut 41 and screw 24 to bring a tooth of the saw into correct registry with the wheel. The turning of the support 51 upon the inclined pivot stud 50 to a position 30° from the plane of the wheel will produce substantially the correct hook angle for the conventional hand saw, the angle of the stud 50 with the horizontal being substantially 12°. However, if a different hook angle is required, this may be obtained by threading the stud 36 downwardly or upwardly to swing the table 32 about its pivotal mounting on the rod 26, thereby varying the angle of the stud 50 and consequently the hook angle of the saw to be sharpened.

The machine is now set up for grinding alternate teeth of the saw. The operator however needs to watch merely the rack 65 with its comparatively large teeth and to index the saw along the rack one tooth at a time, alternate teeth of the saw being ground in the process. When this procedure is finished, the base of the machine is caused to tilt in the opposite direction and the saw support 51 is moved on its pivot 50 from one of the dotted line positions in Fig. 4 to the other dotted line position thereof, in other words until the support is again in horizontal position. This provides the same hook angle as before. The depth of tooth adjustment, controlled by screw 24, is also not disturbed. Thereafter, in order to grind the remaining teeth of the saw, it is only necessary to reverse the saw, that is so that the handle extends toward the left instead of the right, and to mount the clamps 69 on the opposite side of the saw, which will then be the upper side. It may also be necessary to change the longitudinal adjustment of the support, and consequently of rack 65, by manipulation of the nut 41.

Indexing of the saw may be accomplished either by the pins 62 alone or by the rack 65 and pin 73, but I prefer to employ both of these indexing means simultaneously for reasons previously given. However, it should be mentioned that when these two indexing means are used together, the pin 73 must be clamped to the saw in position to register with a tooth of the rack 65 while the teeth of the saw are held in engagement with pins 62. The rack 65 and the pins 62 will then be in cooperative relation.

It will also be obvious that although I have shown teeth on the bar 65 and a pin 73 on the saw, these parts might just as well be interchanged, that is to say the bar 65 might be provided with pins and the clamp 69 with teeth arranged to engage such pins, or the bar 65 might be dispensed with altogether and the clamp 69 provided with a series of teeth adapted to engage with the pins 62. In the construction of the appended claims it is to be understood that I consider these two alternative arrangements mechanical equivalents.

It will also be understood that grinding wheels of different peripheral contours may be substituted for the wheel 15 in order to perform sharpening operations upon tools of different characters. For instance, bread slicing knives which have curved serrations may be sharpened by the use of a wheel having a curved periphery complementary to the curve of a single serration.

Having thus described my invention, I claim:

1. In a saw sharpener, an abrading tool, means for mounting said tool, means for driving said tool, means for holding said mounting in a position to locate the tool in a vertical plane or in an inclined plane upon either side of the vertical, a saw support adjustable to present the saw to the abrading tool in a horizontal position in all positions of the abrading tool, means carried by the support for guiding the saw into indexed position as it is moved with respect to the support in the direction of the tool, and means for adjusting said support longitudinally to vary the position of the said guiding means with respect to the tool.

2. In a saw sharpener, a sharpening tool, means for driving the same, a saw support arranged in front of the tool, a rack mounted on said support and extending longitudinally thereof, said rack having sockets spaced in accordance with the spacing of like teeth in the saw to be sharpened, an indexing pin adapted to engage in said sockets, and means for clamping said pin to the saw to be sharpened, said last named means comprising a resilient element adapted to yield as the saw is fed toward the sharpening tool.

3. In a machine of the character described, a base adapted to rest upon a work bench, an abrading wheel fixed upon said base, a rib extending downwardly from said base half-way between the side edges thereof and parallel to the plane of said wheel, and a saw support pivotally mounted on said base and movable upon its pivot into a horizontal position when the base is tilted in either direction upon its rib.

4. In a machine of the character described, a base adapted to rest upon a work bench, an abrading wheel fixed upon said base, a rib extending downwardly from said base half-way between the side edges thereof and parallel to the plane of said wheel, and a saw support pivotally mounted on said base and movable upon its pivot into a horizontal position when the base is tilted in either direction upon its rib, said rib extending less than the full length of the base, whereby the base may be blocked up in horizontal position by a transversely extending bar.

5. In a machine of the character described, a base adapted to rest upon a work bench, an abrading wheel fixed upon said base, a rib extending downwardly from said base half-way between the side edges thereof and parallel to the plane of said wheel, a bracket mounted on the base in front of the wheel and inclined rearwardly toward the wheel, and a saw support pivotally mounted on said inclined bracket and movable into a horizontal position whenever the base is tilted in either direction upon its rib.

6. In a machine of the character described, a base adapted to rest upon a work bench, an abrading wheel fixed upon said base, a rib extending downwardly from said base half-way between the side edges thereof and parallel to the plane of said wheel, a bracket mounted on the base in front of the wheel, and a saw support pivotally mounted on said bracket and movable into a horizontal position whenever the base is tilted in either direction upon its rib, said bracket being mounted on a transverse pivot, whereby the angularity of the pivotal mounting of the saw support may be varied.

7. In a machine of the character described, a base adapted to rest upon a work bench, an abrading wheel fixed upon said base, a rib extending downwardly from said base half-way between the side edges thereof and parallel to the plane of said wheel, a bracket mounted on the base in front of the wheel, a saw support pivotally mounted on said bracket and movable into a horizontal position whenever the base is tilted in either direction upon its rib, and means for adjusting said bracket transversely of the wheel.

8. In a machine of the character described, a base adapted to rest upon a work bench, an abrading wheel fixed upon said base, a rib extending downwardly from said base half-way between the side edges thereof and parallel to the plane of said wheel, a bracket mounted on the base in front of the wheel, a saw support pivotally mounted on said bracket and movable into a horizontal position whenever the base is tilted in either direction upon its rib, and means for adjusting said bracket toward and away from the wheel and transversely of the wheel.

9. In a machine of the character described, a base adapted to rest upon a work bench, an abrading wheel fixed upon said base, a rib extending downwardly from said base between the side edges thereof, and a saw support pivotally mounted on said base and movable upon its pivot into a horizontal position when the base is tilted in either direction upon its rib.

10. In a machine of the character described, a base adapted to rest upon a work bench, an abrading wheel fixed upon said base, a rib extending downwardly from said base between the side edges thereof and parallel to the plane of said wheel, and a saw support pivotally mounted on said base and movable upon its pivot into a horizontal position when the base is tilted in either direction upon its rib.

AUSTIN C. ELDER.